(12) United States Patent
Zhao et al.

(10) Patent No.: US 12,174,410 B2
(45) Date of Patent: Dec. 24, 2024

(54) BACKLIGHT MODULE AND DISPLAY DEVICE

(71) Applicant: TCL CHINA STAR OPTOELECTRONICS TECHNOLOGY CO., LTD., Guangdong (CN)

(72) Inventors: Bin Zhao, Guangdong (CN); Juncheng Xiao, Guangdong (CN); Junling Liu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/758,168

(22) PCT Filed: Jun. 24, 2022

(86) PCT No.: PCT/CN2022/101232
§ 371 (c)(1),
(2) Date: Jun. 29, 2022

(87) PCT Pub. No.: WO2023/236266
PCT Pub. Date: Dec. 14, 2023

(65) Prior Publication Data
US 2024/0192429 A1    Jun. 13, 2024

(30) Foreign Application Priority Data
Jun. 8, 2022    (CN) .......................... 202210643137.3

(51) Int. Cl.
*F21V 8/00*     (2006.01)
*G02F 1/13357*  (2006.01)
(Continued)

(52) U.S. Cl.
CPC .......... *G02B 6/005* (2013.01); *G02B 6/0068* (2013.01); *G02F 1/133621* (2013.01); *G02F 1/1368* (2013.01); *G02F 1/137* (2013.01)

(58) Field of Classification Search
CPC . G02B 6/005; G02B 6/0068; G02F 1/133621; G02F 1/1368; G02F 1/137
See application file for complete search history.

(56) References Cited

U.S. PATENT DOCUMENTS 8,408,775 B1 *   4/2013   Coleman ........... G02F 1/133526
                                                 362/616
9,746,664 B1 *   8/2017   Hamburgen ............ G06F 3/041
(Continued)

FOREIGN PATENT DOCUMENTS

CN        1881034 A      12/2006
CN      201156371 Y      11/2008
(Continued)

OTHER PUBLICATIONS

Chinese Office Action issued in corresponding Chinese Patent Application No. 202210643137.3 dated May 12, 2023, pp. 1-7.
(Continued)

*Primary Examiner* — Mary Ellen Bowman

(57) ABSTRACT

The present application discloses a backlight module and a display device. The backlight module includes a light guide plate, and the light-emitting surface includes a plurality of light-emitting units arranged in rows. A backlight plate is arranged on the light guide plate, and a plurality of transparent hole units are arranged on the backlight plate. A shutter layer is arranged on the backlight plate, and a number of shutter units are arranged on the shutter layer. The shutter units are arranged corresponding to the transparent hole
(Continued)

units. The shutter units are used to control whether light passing through the transparent hole units passes through the shutter layer.

17 Claims, 2 Drawing Sheets

(51) Int. Cl.
 *G02F 1/1368* (2006.01)
 *G02F 1/137* (2006.01)

(56) References Cited

U.S. PATENT DOCUMENTS

| | | | | |
|---|---|---|---|---|
| 2006/0284532 | A1* | 12/2006 | Kurihara | G02F 1/133617 313/112 |
| 2015/0362662 | A1* | 12/2015 | Feng | G02B 6/0078 362/601 |

FOREIGN PATENT DOCUMENTS

| | | |
|---|---|---|
| CN | 102913866 A | 2/2013 |
| CN | 203771205 U | 8/2014 |
| CN | 104075186 A | 10/2014 |
| CN | 107908042 A | 4/2018 |
| CN | 111025746 A | 4/2020 |
| CN | 213750389 U | 7/2021 |
| JP | 2000162981 A | 6/2000 |
| TW | 201305668 A | 2/2013 |

OTHER PUBLICATIONS

International Search Report in International application No. PCT/CN2022/101232, mailed on Dec. 22, 2022.

Written Opinion of the International Search Authority in International application No. PCT/CN2022/101232, mailed on Dec. 22, 2022.

* cited by examiner

BACKLIGHT MODULE AND DISPLAY DEVICE

FIELD OF INVENTION

The present invention relates to a field of display panel technology, in particular, to a backlight module and a display device.

DESCRIPTION OF PRIOR ART

Color gamut refers to a color composition range of a certain color mode. In life and work, the color gamut also refers to a color range that can be represented by printing and copying on specific equipment, such as displays, printers, etc.

At present, most LCD displays are LED white backlight+ open cell, and the color gamut is about NTSC85%, while color gamuts of OLED displays and LED displays can easily reach NTSC100%. Therefore, improving the color gamut of LCD displays is one of the directions to improve its competitive selling points.

Therefore, it is necessary to develop a new backlight module to solve a problem of low color gamut of existing liquid crystal display devices.

SUMMARY

The embodiments of the present invention provides a backlight module to solve a problem of low color gamut of existing liquid crystal display devices.

In order to solve the above technical problems, the embodiments of the present invention disclose following technical solutions:

On the one hand, providing a backlight module, comprising: a light guide plate having a light-emitting surface, the light-emitting surface comprising light-emitting units arranged in a plurality of rows; a backlight plate arranged on the light-emitting surface of the light guide plate, the backlight plate provided with a plurality of transparent hole units arranged in an array; a shutter layer arranged on the backlight plate, the shutter layer provided with a plurality of shutter units arranged in an array, the shutter units arranged corresponding to the transparent hole units, and the shutter units used to control whether light passing through the transparent hole units passes through the shutter layer.

In addition to, or as an alternative to, one or more of the features disclosed above, the backlight module further comprises a light strip arranged at a side of the light guide plate; the light strip comprises a plurality of light sources arranged at intervals, and each of the light sources comprises a red light source emitting red light, a green light source emitting green light, and a blue light source emitting blue light.

In addition to, or as an alternative to, one or more of the features disclosed above, an extension direction of the light strip is perpendicular to an extension direction of the light-emitting units.

By arranging a row of light strips on the light guide plate to provide light sources, a number of the light sources can be effectively saved compared with a straight down backlight, thus saving costs.

In addition to, or as an alternative to, one or more of the features disclosed above, each of the light-emitting units comprises at least one row of red light-emitting part, at least one row of green light-emitting part, and at least one row of blue light-emitting part; the red light source is arranged at a side of the red light-emitting part, the green light source is arranged at a side of the green light-emitting part, and the blue light source is arranged at a side of the blue light-emitting part.

In addition to, or as an alternative to, one or more of the features disclosed above, the light sources adopt light-emitting diodes.

In addition to, or as an alternative to, one or more of the features disclosed above, each of the transparent hole units comprises at least one red light transparent hole, at least one green light transparent hole, and at least one blue light transparent hole; the red light transmitting hole is arranged above the red light-emitting part for transmitting red light; the green light transmitting hole is arranged above the green light-emitting part for transmitting green light; and the blue light transmitting hole is arranged above the blue light-emitting part for transmitting blue light.

In addition to, or as an alternative to, one or more of the features disclosed above, each of the shutter units comprises at least one red shutter, at least one green shutter, and at least one blue shutter; the red shutter is located above the red light transparent hole, the green shutter is located above the green light transparent hole, and the blue shutter is located above the blue light transparent hole.

In addition to, or as an alternative to, one or more of the features disclosed above, the red shutter, the red shutter, the green shutter, and the blue shutter all comprise an open state and a closed state; a shutter in the open state enables light to pass through the shutter layer, and a shutter in the closed state prevents light from passing through the shutter layer.

In addition to, or as an alternative to, one or more of the features disclosed above, when the red shutter is in the open state, red light passing through the red light transparent hole passes through the red shutter; when the red shutter is in the closed state, red light passing through the red light transparent hole is prevented from passing through the red shutter; when the green shutter is in the open state, green light passing through the green light transparent hole passes through the green shutter; when the green shutter is in the closed state, green light passing through the green light transparent hole is prevented from passing through the green shutter; when the blue shutter is in the open state, blue light passing through the blue light transparent hole passes through the blue shutter; when the blue shutter is in the closed state, blue light passing through the blue light transparent hole is prevented from passing through the blue shutter.

In addition to, or as an alternative to, one or more of the features disclosed above, when the red shutter is in the open state, and the green shutter and the blue shutter are both in the closed state, the shutter units display red light; when the green shutter is in the open state, and the red shutter and the blue shutter are both in the closed state, the shutter units display green light; when the blue shutter is in the open state, and the green shutter and the red shutter are both in the closed state, the shutter units display blue light; when the red shutter the green shutter, and the blue shutter are all in the open state, the shutter units display white light.

In addition to, or as an alternative to, one or more of the features disclosed above, a projection of the red light transparent hole on the light guide plate falls within a projection of the red shutter on the light guide plate, so as to ensure that monochromatic red light passing through the red light transparent hole all pass through the shutter layer; a projection of the green light transparent hole on the light guide plate falls within a projection of the green shutter on the light guide plate, so as to ensure that monochromatic green light passing through the green light transparent hole all pass through the shutter layer; and a projection of the blue light transparent hole on the light guide plate falls within a projection of the blue shutter on the light guide plate, so as to ensure that monochromatic blue light passing through the blue light transparent hole all pass through the shutter layer.

In addition to, or as an alternative to, one or more of the features disclosed above, a material of the shutter units is liquid crystals, and the red shutter, the green shutter, and the blue shutter are controlled to be in the closed state or the open state by controlling deflections of the liquid crystals.

In addition to, or as an alternative to, one or more of the features disclosed above, the backlight module further comprises a TFT film layer, the shutter units are connected with the TFT film layer, and deflections of the liquid crystals are controlled through the TFT film layer.

By controlling the shutter to be the open state or the closed state through the TFT film, RGB light-emitting points can be accurately controlled, and the color gamut of the liquid crystal display device can be improved by using red, blue, and green light sources as the backlight instead of fluorescent pink conversion.

On the other hand, providing a display device comprising the backlight module according to claim 1; and a display substrate arranged on the backlight module; the display substrate comprising a plurality of sub-pixels arranged in an array, and the shutter units correspond to the sub-pixels.

One of the above technical solutions comprises following advantages or beneficial effects: the color gamut of the liquid crystal display device can be improved by using the red, blue, and green light sources as the backlight instead of the fluorescent pink conversion.

BRIEF DESCRIPTION OF DRAWINGS

The technical scheme and other beneficial effects of the present invention will be apparent through the detailed description of the specific embodiments of the present invention in combination with accompanying drawings.

REFERENCE NUMBERS backlight module—100; light guide plate—10;
backlight—20; shutter layer—30;
light strip—40; light-emitting surface—11;
light-emitting unit 110; red light-emitting part—111;
green light-emitting part—112; blue light-emitting part—113;
transparent hole unit—21; red light transparent hole—211;
green light transparent hole—212; blue light transparent hole—213;
shutter unit—31; red shutter—311;
green shutter—312; blue shutter—313;
light source—41; red light source—411;
green light source—412; blue light source —413.

DETAILED DESCRIPTION OF PREFERRED EMBODIMENTS

The specific structure and functional details disclosed herein are only representative and are for a purpose of describing exemplary embodiments of the present application. However, the present application can be embodied in many alternative forms, and should not be interpreted as being limited only to the embodiments set forth herein.

In the description of the present invention, it should be understood that the orientation or positional relationship indicated by the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise" is based on an orientation or a positional relationship shown in the attached drawings, only for the convenience of describing the present invention and simplifying the description, rather than indicating or implying that the device or element referred to must have a specific orientation constructed and operated in a specific orientation, therefore, it cannot be understood as a restriction on the present invention.

Figure 1:
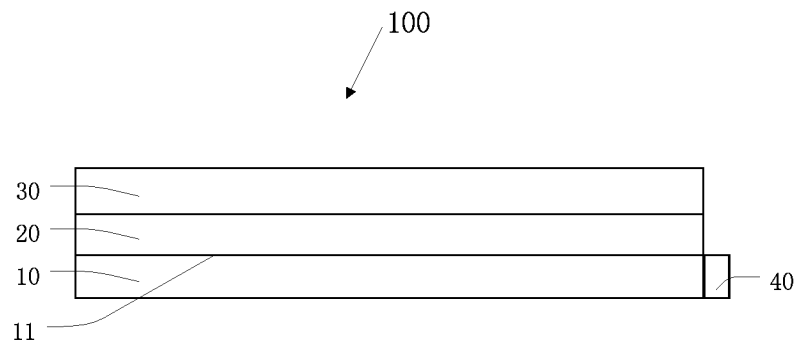
FIG. 1 is a schematic cross-sectional structural diagram of a backlight module provided by embodiments of the present invention.
Figure 2:
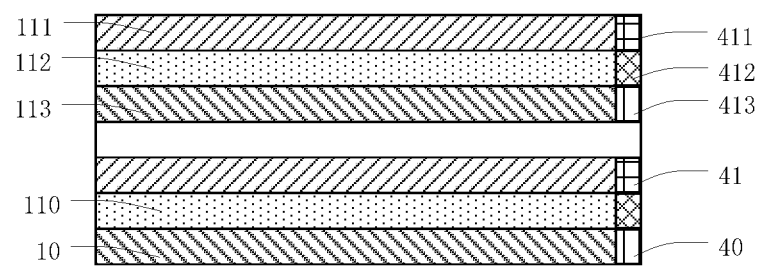
FIG. 2 is a schematic top view structural diagram of a light guide plate provided by the embodiments of the present invention.
Figure 3:
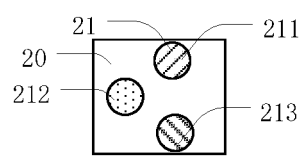
FIG. 3 is a schematic top view structural diagram of a light transparent hole unit provided by the embodiments of the present invention.
Figure 4:
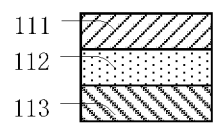
FIG. 4 is a schematic top view structural diagram of the light guide plate under the light transparent hole unit provided by the embodiments of the present invention.
Figure 5:
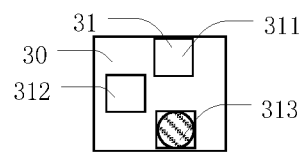
FIG. 5 is a schematic top view structural diagram of a shutter unit provided by the embodiments of the present invention.

Referring to FIGS. 1 to 5, this embodiment provides a backlight module 100, comprising a light guide plate 10, a backlight plate 20, a shutter layer 30, a light strip 40, and a TFT film layer (not shown).

The light guide plate 10 comprises a light-emitting surface 11. The light-emitting surface 11 comprises a plurality of light-emitting units 110 arranged in a plurality of rows, and each of the light-emitting units 110 comprises a row of red light-emitting part 111, a row of green light-emitting part 112, and a row of blue light-emitting part 113. There is also a gap between two adjacent light-emitting units 110.

In other embodiments, each of the light-emitting units 110 can comprises at least two rows of red light-emitting units 111, or at least two rows of green light-emitting units 112, or at least two rows of blue light-emitting units 113. A number of the red light-emitting units 111, a number of the green light-emitting units 112, and a number of the blue light-emitting units 113 are not limited.

The light strip 40 is arranged at a side of the light guide plate 10. The light strip 40 comprises a number of light sources 41 arranged at intervals. The light sources 41 comprise a red light source 411 emitting red light, a green light source 412 emitting green light, and a blue light source 413 emitting blue light. The red light source 411 is arranged on a side of the red light-emitting part 111, the green light source 412 is arranged on a side of the green light-emitting part 112, and the blue light source 413 is arranged on a side of the blue light-emitting part 113.

An extension direction of the light strip 40 is perpendicular to an extension direction of the light-emitting units 110. The light sources 41 use Light-emitting diodes (LEDs). LEDs have advantages of high brightness, long service life, and low power consumption.

By arranging a row of light strips 40 on the light guide plate 10 to provide the light sources 41, a number of the light sources 41 can be effectively saved compared with a straight down backlight, thereby saving cost.

The backlight plate 20 is arranged on the light-emitting surface 11 of the light guide plate 10, and the backlight plate 20 is provided with a plurality of transparent hole units 21 arranged in an array. Each of the light transmitting hole units 21 comprises a red light transmitting hole 211, a green light transmitting hole 212, and a blue light transmitting hole 213. The red light transmitting hole 211 is arranged above the red light-emitting part 111 for allowing transmission of red light. The green light transmitting hole 212 is arranged above the green light-emitting part 112 for allowing transmission green light. The blue light transmitting hole 213 is arranged above the blue light-emitting part 113 for allowing transmission blue light.

In other embodiments, each of the transparent hole units 21 can comprise at least two red light transparent holes 211, at least two green light transparent holes 212, and at least two blue light transparent holes 213. A number of the red light transparent holes 211, a number of the green light transparent holes 212, and a number of the blue light transparent holes 213 are not limited.

The shutter layer 30 is arranged on the backlight plate 20. The shutter layer 30 is provided with a plurality of shutter units 31 arranged in an array. The shutter units 31 are arranged corresponding to the transparent hole units 21. The shutter units 31 are used to control whether lights passing through the transparent hole units 21 passes through the shutter layer 30.

Each of the shutter units 31 comprises a red shutter 311, a green shutter 312, and a blue shutter 313. The red shutter 311 is located above the red light transparent hole 211, the green shutter 312 is located above the green light transparent hole 212, and the blue shutter 313 is located above the blue light transparent hole 213.

In other embodiments, each of the shutter units 31 can comprise at least two red shutters 311, at least two green shutters 312, and at least two blue shutters 313. A number of the red shutters 311, a number of the green shutters 312, and a number of the blue shutters 313 are not limited.

The red shutter 311, the green shutter 312, and the blue shutter 313 all have an open state and a closed state. A shutter in the open state enables light to pass through the shutter layer 30, and a shutter in the closed state prevents light from passing through the shutter layer 30.

When the red shutter 311 is in the open state, red light passing through the red light transparent hole 211 passes through the red shutter 311; when the red shutter 311 is in the closed state, red light passing through the red light transparent hole 211 is prevented from passing through the red shutter 311. When the green shutter 312 is in the open state, green light passing through the green light transparent hole 212 passes through the green shutter 312; when the green shutter 312 is in the closed state, green light passing through the green light transparent hole 212 is prevented from passing through the green shutter 312. When the blue shutter 313 is in the open state, blue light passing through the blue light transparent hole 213 passes through the blue shutter 313; when the blue shutter 313 is in the closed state, blue light passing through the blue light transparent hole 213 is prevented from passing through the blue shutter 313.

When the red shutter 311 is in the open state, and the green shutter 312 and the blue shutter 313 are both in the closed state, the shutter units 31 display red light. When the green shutter 312 is in the open state, and the red shutter 311 and the blue shutter 313 are both in the closed state, the shutter units 31 display green light. When the blue shutter 312 is in the open state, and the green shutter 312 and the red shutter 311 are both in the closed state, the shutter units 31 display blue light. When the red shutter 311, the green shutter 312, and the blue shutter 313 are all in the open state, the shutter units 31 display white light.

A projection of the red light transmitting hole 211 on the light guide plate 10 falls within a projection of the red shutter 311 on the light guide plate 10, so as to ensure that monochromatic red light passing through the red light transmitting hole 211 all pass through the shutter layer 30. A projection of the green light transmitting hole 212 on the light guide plate 10 falls within a projection of the green shutter 312 on the light guide plate 10, so as to ensure that all monochromatic green light passing through the green light transmitting hole 212 all pass through the shutter layer 30. A projection of the blue light transparent hole 213 on the light guide plate 10 falls within a projection of the blue shutter 313 on the light guide plate 10, so as to ensure that monochromatic blue light passing through the blue light transparent hole 213 all pass through the shutter layer 30.

A material of the shutter units 31 is liquid crystals, and the red shutter 311, the green shutter 312, and the blue shutter 313 are controlled to be in the closed state or the open state by controlling deflections of the liquid crystals.

The shutter units 31 are connected with the TFT film layer, and control the deflections of the liquid crystals through the TFT film layer, thereby controlling the red shutter 311, the green shutter 312, and the blue shutter 313 to be in the closed state or the open state.

The shutter units 31 are arranged corresponding to sub-pixels, And controlling the open state or the closed state of the shutters through the TFT film layer, can accurately control light-emitting points of RGB sub-pixels, and can improve color gamut of a liquid crystal display device by using the red, blue, and green light sources as the backlight instead of fluorescent pink conversion.

The embodiments further provide a display device, comprising a backlight module 100, and a display substrate arranged on the backlight module 100. The display substrate comprises several sub-pixels arranged in an array, and the shutter units 31 are arranged corresponding to the sub-pixels.

The shutter units 31 are arranged corresponding to the sub-pixels. And controlling the open state or the closed state of shutters through the TFT film layer, can accurately control light-emitting points of RGB sub-pixels, and can improve color gamut of the liquid crystal display device by using red, blue, and green light sources as the backlight instead of the fluorescent pink conversion.

A backlight module and a display device are described in detail above. And in this paper, specific examples are applied to explain the principle and implementation mode of the application. The above embodiments are only examples of the implementation of the present invention. Those of ordinary skill in the art should understand that they can still modify the technical scheme recorded in the above embodiments, or equivalent replace some of the technical features. These modifications or substitutions do not separate the essence of the corresponding technical scheme from the scope of the technical scheme of each embodiment of the present invention.

What is claimed is:

1. A backlight module, comprising:
    a light guide plate, having a light-emitting surface divided into light-emitting units arranged in a plurality rows, and each of the light-emitting units comprising light emitting parts arranged in a plurality sub-rows;
    a light strip, arranged at a lateral side of the light guide plate, comprising a plurality of light source groups respectively corresponding to the light-emitting units, each of the light source groups comprising a plurality of light sources respectively corresponding to the light emitting parts;

a backlight plate, arranged on the light-emitting surface of the light guide plate, and provided with a plurality of transparent hole units arranged in an array, wherein each of the light-emitting units corresponds to one row of the transparent hole units; and a shutter layer, arranged on the backlight plate, provided with a plurality of shutter units corresponding to the transparent hole units, respectively, wherein the light emitted by each of the light sources is transmitted through the light guide plate and then emitted from a corresponding one of the light emitting parts without changing the color, and each of the shutter units is configured to control whether light emitted from the light emitting parts and passing through the transparent hole units passes through the shutter layer.

2. The backlight module according to claim 1, wherein the plurality of light source groups are arranged at intervals, and there is a gap between two adjacent rows of the light-emitting units.

3. The backlight module according to claim 1, wherein the light sources of each of the light source group comprises a red light source emitting red light, a green light source emitting green light, and a blue light source emitting blue light; the light emitting parts of each of the light-emitting units comprises a red light-emitting part, a green light-emitting part, and a blue light-emitting part; the red light source is arranged corresponding to the red light-emitting part, the green light source is arranged corresponding to the green light-emitting part, and the blue light source is arranged corresponding to the blue light-emitting part.

4. The backlight module according to claim 3, wherein the backlight plate is provided with a plurality of light transparent holes corresponding to the light emitting parts, and the light transparent holes comprise red light transparent holes corresponding to red light emitting parts, green light transmitting holes corresponding to green light emitting parts, and blue light transmitting holes corresponding to blue light emitting parts, and the light emitted from each of the light emitting parts passes through corresponding ones of the light transparent holes without changing the color;

the red light transparent holes, the green light transmitting holes, and the blue light transmitting holes are arranged to form the transparent hole units, each of the transparent hole units comprises one of the red light transparent holes, one of the green light transparent holes, and one of the blue light transparent holes.

5. The backlight module according to claim 4, wherein the shutter layer is provided with a plurality of shutters respectively corresponding to the plurality of light transparent holes, the shutters comprise red shutters respectively corresponding to the red light transparent holes, green shutters respectively corresponding to the green light transparent holes, and blue shutters respectively corresponding to the blue light transparent holes, and the light emitted from each of the light transparent holes is prevent from passing through or passes through a corresponding one of the shutters without changing the color;

the red shutters, the green shutters, and the blue shutters are arranged to form the shutter units, each of the shutter units comprises one of the red shutters, one of the green shutters, and one of the blue shutters.

6. The backlight module according to claim 5, wherein each of the plurality of shutters comprises an open state and a closed state; under the open state, the light emitted from one of the light transparent holes passes through the corresponding one of the shutters without changing the color, and under the closed state, the light emitted from one of the light transparent holes is prevent from passing through the shutter layer; and the light emitted from each of the transparent hole units is mixed after passing through a corresponding one of the shutter units, and a display color of of the mixed light is controlled by the open state and the closed state of each of the shutters of the corresponding one of the shutter units.

7. The backlight module according to claim 6, wherein a material of the shutter layer is liquid crystals, and each of the shutters is controlled to be in the closed state or the open state by controlling deflections of corresponding ones of the liquid crystals.

8. The backlight module according to claim 7, wherein the backlight module further comprises a TFT film layer, each of the shutters is connected with the TFT film layer, and deflections of the liquid crystals corresponding to each of the shutters are independently controlled through the TFT film layer.

9. The backlight module according to claim 1, wherein an extension direction of the light strip is perpendicular to an extension direction of the light-emitting units, and is perpendicular to a thickness direction of the backlight module.

10. The backlight module according to claim 1, wherein the light sources adopt light-emitting diodes.

11. The backlight module according to claim 5, wherein a projection of each of the light transparent holes on the light guide plate falls within a projection of the corresponding one of the shutters on the light guide plate.

12. A display device, comprising:
the backlight module according to claim 1; and
a display substrate arranged on the backlight module;
the display substrate comprising a plurality of sub-pixels arranged in an array, and the shutter units correspond to the sub-pixels, respectively.

13. The display device according to claim 12, wherein the plurality of light source groups are arranged at intervals, and there is a gap between two adjacent rows of the light-emitting units.

14. The display device according to claim 12, wherein the light sources of each of the light source group comprises a red light source emitting red light, a green light source emitting green light, and a blue light source emitting blue light; the light emitting parts of each of the light-emitting units comprises a red light-emitting part, a green light-emitting part, and a blue light-emitting part; the red light source is arranged corresponding to the red light-emitting part, the green light source is arranged corresponding to the green light-emitting part, and the blue light source is arranged corresponding to the blue light-emitting part.

15. The display device according to claim 14, wherein the backlight plate is provided with a plurality of light transparent holes corresponding to the light emitting parts, and the light transparent holes comprise red light transparent holes corresponding to red light emitting parts, green light transmitting holes corresponding to green light emitting parts, and blue light transmitting holes corresponding to blue light emitting parts, and the light emitted from each of the light emitting parts passes through corresponding ones of the light transparent holes without changing the color;

the red light transparent holes, the green light transmitting holes, and the blue light transmitting holes are arranged to form the transparent hole units, each of the transparent hole units comprises one of the red light transparent holes, one of the green light transparent holes, and one of the blue light transparent holes.

16. The display device according to claim 15, wherein the shutter layer is provided with a plurality of shutters respectively corresponding to the plurality of light transparent holes, the shutters comprise red shutters respectively corresponding to the red light transparent holes, green shutters respectively corresponding to the green light transparent holes, and blue shutters respectively corresponding to the blue light transparent holes, and the light emitted from each of the light transparent holes is prevent from passing through or passes through a corresponding one of the shutters without changing the color;

the red shutters, the green shutters, and the blue shutters are arranged to form the shutter units, each of the shutter units comprises one of the red shutters, one of the green shutters, and one of the blue shutters.

17. The display device according to claim 16, wherein each of the plurality of shutters comprises an open state and a closed state; under in the open state, the light emitted from one of the light transparent holes passes through the corresponding one of the shutters without changing the color, and under the closed state, the light emitted from one of the light transparent holes is prevent from passing through the shutter layer; and the light emitted from each of the transparent hole units is mixed after passing through a corresponding one of the shutter units, and a display color of of the mixed light is controlled by the open state and the closed state of each of the shutters of the corresponding one of the shutter units.

* * * * *